(12) United States Patent
Kim et al.

(10) Patent No.: US 11,263,997 B2
(45) Date of Patent: Mar. 1, 2022

(54) METHOD FOR DISPLAYING SCREEN IMAGE AND ELECTRONIC DEVICE THEREFOR

(71) Applicant: Samsung Electronics Co., Ltd., Gyeonggi-do (KR)

(72) Inventors: Kibok Kim, Gyeonggi-do (KR); Chang-Do Kim, Gyeongsangbuk-do (KR); Hongseok Kwon, Gyeonggi-do (KR); Youngseok Lim, Gyeonggi-do (KR); Eun Jung Hyun, Seoul (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/476,457

(22) PCT Filed: Jan. 5, 2018

(86) PCT No.: PCT/KR2018/000250
§ 371 (c)(1),
(2) Date: Jul. 8, 2019

(87) PCT Pub. No.: WO2018/128460
PCT Pub. Date: Jul. 12, 2018

(65) Prior Publication Data
US 2020/0005735 A1     Jan. 2, 2020

(30) Foreign Application Priority Data
Jan. 6, 2017   (KR) .................... 10-2017-0002211

(51) Int. Cl.
*G09G 5/377* (2006.01)
*G06F 3/0481* (2013.01)
(Continued)

(52) U.S. Cl.
CPC ......... *G09G 5/377* (2013.01); *G06F 3/04817* (2013.01); *G06F 9/451* (2018.02);
(Continued)

(58) Field of Classification Search
CPC ......... G06F 2203/04804; G06F 3/0481; G06F 3/04817; G06F 3/04886; G06F 9/451;
(Continued)

(56) References Cited

U.S. PATENT DOCUMENTS 9,292,150 B2    3/2016 Engel et al.
11,048,372 B2*  6/2021 Revach .............. G06F 3/04897
(Continued)

FOREIGN PATENT DOCUMENTS

JP    2013016017    1/2013
KR    1020090095852    9/2009
(Continued)

OTHER PUBLICATIONS

PCT/ISA/210 Search Report issued on PCT/KR2018/000250 (pp. 5).
PCT/ISA/237 Written Opinion issued on PCT/KR2018/000250 (pp. 5).

*Primary Examiner* — Xiao M Wu
*Assistant Examiner* — Scott E Sonners
(74) *Attorney, Agent, or Firm* — The Farrell Law Firm, P.C.

(57) ABSTRACT

The purpose of the present invention is to display layers in an electronic device, wherein an operating method of the electronic device can comprise the steps of: displaying, on a display, a first layer of which at least a portion is transparent; and displaying, on the display, a second layer of which at least a portion is overlapped with the first layer, and which is disposed on a lower end of the first layer, wherein the at least portion of the second layer can be set to be transparently displayed. In addition, other embodiments are possible.

14 Claims, 15 Drawing Sheets

(51) Int. Cl.
*G06F 9/451* (2018.01)
*G06F 3/04817* (2022.01)

(52) U.S. Cl.
CPC .............. *G06F 2203/04804* (2013.01); *G09G 2340/12* (2013.01); *G09G 2340/145* (2013.01)

(58) Field of Classification Search
CPC .. G06F 3/0416; G06F 3/0482; G06F 3/04842; G06F 3/04845; G06F 3/04847; G09G 2320/08; G09G 2340/12; G09G 5/003; G09G 5/377; G09G 2320/06; G09G 2340/04; G09G 2340/145; G06T 11/60; G06T 11/00; G06T 2200/24; G06T 2207/20212
See application file for complete search history.

(56) References Cited

U.S. PATENT DOCUMENTS

| | | | |
|---|---|---|---|
| 2006/0061597 | A1 | 3/2006 | Hui |
| 2007/0101282 | A1* | 5/2007 | Goossen ................ G09G 5/42 715/764 |
| 2009/0031237 | A1* | 1/2009 | Jessen ................... G06F 3/0481 715/768 |
| 2012/0166989 | A1* | 6/2012 | Brown ................ G06F 3/04842 715/768 |
| 2014/0035942 | A1 | 2/2014 | Yun et al. |
| 2014/0237367 | A1* | 8/2014 | Jung ................... G06F 3/04845 715/728 |
| 2014/0372938 | A1* | 12/2014 | Park ...................... G06F 3/0488 715/793 |
| 2016/0370864 | A1* | 12/2016 | Choi ........................ G06F 3/017 |
| 2016/0372085 | A1 | 12/2016 | Lee et al. |
| 2018/0166045 | A1* | 6/2018 | Shah ....................... G09G 5/363 |

FOREIGN PATENT DOCUMENTS

| | | |
|---|---|---|
| KR | 1020140017420 | 2/2014 |
| KR | 1020140133078 | 11/2014 |
| KR | 1020140145894 | 12/2014 |
| KR | 1020150117128 | 10/2015 |
| KR | 1020160149603 | 12/2016 |

* cited by examiner

METHOD FOR DISPLAYING SCREEN IMAGE AND ELECTRONIC DEVICE THEREFOR

PRIORITY

This application is a National Phase Entry of PCT International Application No. PCT/KR2018/000250, which was filed on Jan. 5, 2018, and claims priority to Korean Patent Application No. 10-2017-0002211, which was filed on Jan. 6, 2017, the content of each of which are incorporated herein by reference.

TECHNICAL FIELD

Various embodiments of the disclosure relate to a method for displaying a screen and an electronic device therefor.

BACKGROUND ART

As the performance of portable electronic devices such as smart phones becomes gradually higher, various services are provided through the electronic device. Specifically, a range of services has been extended to more advanced services, including games, messengers, document editing, reproduction and editing of an image/moving image, and the like, in addition to basic services, including a telephone call, text transmission, and the like. As various services are provided through an electronic device, various functions are required as well as simple input/output and processing of data.

DETAILED DESCRIPTION OF THE INVENTION

Technical Problem

An electronic device can provide advanced services and users, who desire to simultaneously receive various services through the electronic device, have increased. As the performance of a portable electronic device becomes higher, various services can be simultaneously executed in the portable electronic device, but there may be a limitation on a method for expressing the various services on a display of a limited size.

Various embodiments of the disclosure provide a method for adjusting screen display in an electronic device, and the electronic device therefor.

Technical Solution

In accordance with an aspect of the disclosure, an operating method of an electronic device may include: displaying a first layer, at least a part of which is transparent, on a display; and displaying a second layer, at least a part of which overlaps the first layer and which is disposed at a lower end of the first layer, on the display. In the operating method, the at least the part of the second layer may be configured to be transparently displayed.

In accordance with another aspect of the disclosure, an electronic device may include a display and a processor. In the electronic device, the processor may be configured to display, on the display, a first layer, at least a part of which is transparent, and a second layer, at least a partial area of which overlaps the first layer and which is disposed at a lower end of the first layer. Further, at least a part of the second layer may be configured to be transparently displayed.

In accordance with still another aspect of the disclosure, a non-transitory computer-readable recording medium including multiple instructions is provided. The multiple instructions may be configured to, when executed by a processor, cause the processor to perform: displaying a first layer, at least a part of which is transparent, on a display; and displaying a second layer, at least a part of which overlaps the first layer and which is disposed at a lower end of the first layer, on the display. In the non-transitory computer-readable recording medium, the at least the part of the second layer may be configured to be transparently displayed.

Advantageous Effects

A method and an electronic device therefor according to various embodiments adjust a transparency level value of a lower end layer among at least one window layer or do not draw the same, and thus can display overlapping layers.

Further, the method and the electronic device therefor according to various embodiments adjust and display a transparency level of an overlapping area between at least one window layer, and thus can improve a user's visibility (observability) of a device.

MODE FOR CARRYING OUT THE INVENTION

Figure 1:
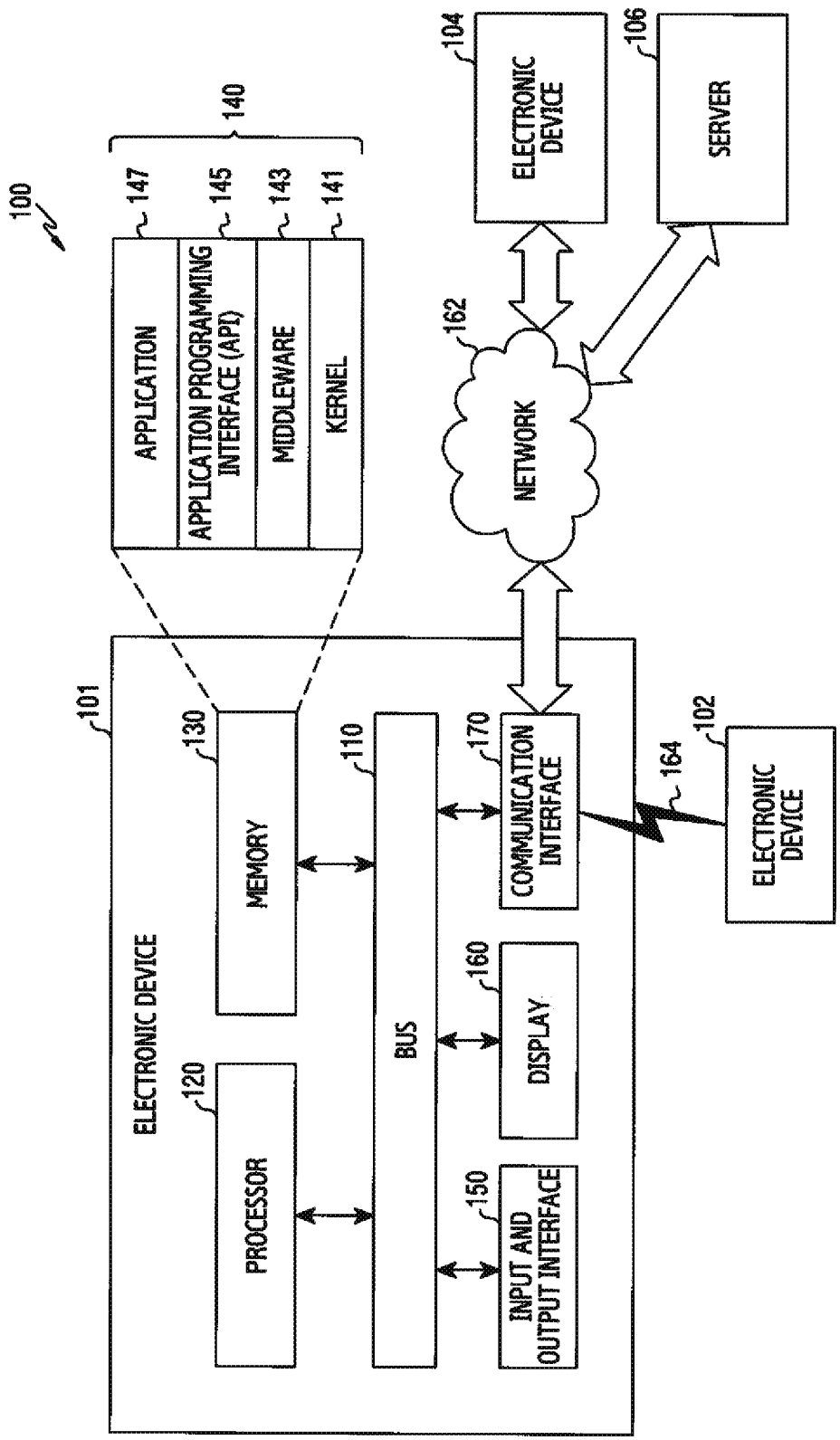
FIG. 1 illustrates an electronic device within a network environment in various embodiments of the disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure. The terms used herein are defined in consideration of functions of the present disclosure and may vary depending on a user's or an operator's intension and usage. Therefore, the terms used herein should be understood based on the descriptions made herein. It is to be understood that the singular forms "a," "an," and "the" include plural referents unless the context clearly dictates otherwise. In the present disclosure, an expression such as "A or B," "at least one of A and B," or "one or more of A and B" may include all possible combinations of the listed items. Expressions such as "first," "second," "primarily," or "secondary," as used herein, may represent various elements regardless of order and/or importance and do not limit corresponding elements. The expressions may be used for distinguishing one element from another element. When it is described that an element (such as a first element) is "(operatively or communicatively) coupled" to or "connected" to another element (such as a second element), the element can be directly connected to the other element or can be connected through another element (such as a third element).

An expression "configured to (or set)" used in the present disclosure may be used interchangeably with, for example, "suitable for," "having the capacity to," "designed to," "adapted to," "made to," or "capable of" according to a situation. A term "configured to (or set)" does not only mean "specifically designed to" by hardware. Alternatively, in some situations, the expression "apparatus configured to" may mean that the apparatus "can" operate together with another apparatus or component. For example, a phrase "a processor configured (or set) to perform A, B, and C" may be at a dedicated processor (such as an embedded processor) for performing a corresponding operation or a generic-purpose processor (such as a Central Processing Unit (CPU) or an application processor (AP)) that can perform a corresponding operation by executing at least one software program stored at a memory device.

An electronic device according to embodiments of the present disclosure, may be embodied as, for example, at least one of a smart phone, a tablet Personal Computer (PC), a mobile phone, a video phone, an e-book reader, a desktop PC, a laptop PC, a netbook computer, a workstation, a server, a Personal Digital Assistant (PDA), a Portable Multimedia Player (PMP), an MPEG 3 (MP3) player, a medical equipment, a camera, and a wearable device. The wearable device can include at least one of an accessory type (e.g., a watch, a ring, a bracelet, an ankle bracelet, a necklace, glasses, a contact lens, or a Head-Mounted-Device (HMD)), a fabric or clothing embedded type (e.g., electronic garments), a body attachable type (e.g., a skin pad or a tattoo), and an implantable circuit. In one embodiment, The electronic device may be embodied as at least one of, for example, a television, a Digital Versatile Disc (DVD) player, an audio device, a refrigerator, an air-conditioner, a cleaner, an oven, a microwave oven, a washing machine, an air cleaner, a set-top box, a home automation control panel, a security control panel, a media box (e.g., Samsung HomeSync™, Apple TV™, or Google TV™), a game console (e.g., Xbox™, PlayStation™), an electronic dictionary, an electronic key, a camcorder, and an electronic frame.

In another embodiment, the electronic device may be embodied as at least one of various medical devices (such as, various portable medical measuring devices (a blood sugar measuring device, a heartbeat measuring device, a blood pressure measuring device, or a body temperature measuring device), a Magnetic Resonance Angiography (MRA) device, a Magnetic Resonance Imaging (MRI) device, a Computed Tomography (CT) device, a scanning machine, and an ultrasonic wave device), a navigation device, a Global Navigation Satellite System (GNSS), an Event Data Recorder (EDR), a Flight Data Recorder (FDR), a vehicle infotainment device, electronic equipment for ship (such as, a navigation device for ship and gyro compass), avionics, a security device, a head unit for a vehicle, an industrial or home robot, a drone, an Automated Teller Machine (ATM) of a financial institution, a Point Of Sales (POS) device of a store, and an Internet of Things (IoT) device (e.g., a light bulb, various sensors, a sprinkler device, a fire alarm, a thermostat, a street light, a toaster, sports equipment, a hot water tank, a heater, and a boiler). According to an embodiment, the electronic device may be embodied as at least one of a portion of furniture, building/construction or vehicle, an electronic board, an electronic signature receiving device, a projector, and various measuring devices (e.g., water supply, electricity, gas, or electric wave measuring device). An electronic device, according to an embodiment, can be a flexible electronic device or a combination of two or more of the foregoing various devices. An electronic device, according to an embodiment of the present disclosure, is not limited to the foregoing devices may be embodied as a newly developed electronic device. The term "user", as used herein, can refer to a person using an electronic device or a device using an electronic device (e.g., an artificial intelligence electronic device).

Referring initially to FIG. 1, an electronic device 101 resides in a network environment 100. The electronic device 101 can include a bus 110, a processor 120, a memory 130, an input/output interface 150, a display 160, and a communication interface 170. The electronic device 101 may be provided without at least one of the components, or may include at least one additional component. The bus 110 can include a circuit for connecting the components 120 through 170 and delivering communication signals (e.g., control messages or data) therebetween. The processor 120 can include one or more of a CPU, an application processor, and a Communication Processor (CP). The processor 120, for example, can perform an operation or data processing with respect to control and/or communication of at least another component of the electronic device 101.

The memory 130 can include a volatile and/or nonvolatile memory. The memory 130, for example, can store commands or data relating to at least another component of the electronic device 101. According to an embodiment, the memory 130 can store software and/or a program 140. The program 140 can include, for example, a kernel 141, middleware 143, an Application Programming Interface (API) 145, and/or an application program (or "application") 147. At least part of the kernel 141, the middleware 143, or the API 145 can be referred to as an Operating System (OS). The kernel 141 can control or manage system resources (e.g., the bus 110, the processor 120, or the memory 130) used for performing operations or functions implemented by the other programs (e.g., the middleware 143, the API 145, or the application program 147). Additionally, the kernel 141 can provide an interface for controlling or managing system resources by accessing an individual component of the electronic device 101 from the middleware 143, the API 145, or the application program 147.

The middleware 143, for example, can serve an intermediary role for exchanging data between the API 145 or the application program 147 and the kernel 141 through communication. Additionally, the middleware 143 can process one or more job requests received from the application program 147, based on their priority. For example, the middleware 143 can assign a priority for using a system resource (e.g., the bus 110, the processor 120, or the memory 130) of the electronic device 101 to at least one of the application programs 147, and process the one or more job requests. The API 145, as an interface through which the application 147 controls a function provided from the kernel 141 or the middleware 143, can include, for example, at least one interface or function (e.g., an instruction) for file control, window control, image processing, or character control. The input/output interface 150, for example, can deliver commands or data inputted from a user or another external device to other component(s) of the electronic device 101, or output commands or data inputted from the other component(s) of the electronic device 101 to the user or another external device.

The display 160, for example, can include a Liquid Crystal Display (LCD), a Light Emitting Diode (LED) display, an Organic Light Emitting Diode (OLED) display, a Micro Electro Mechanical Systems (MEMS) display, or an electronic paper display. The display 160, for example, can display various contents (e.g., texts, images, videos, icons, and/or symbols) to the user. The display 160 can include a touch screen, for example, and receive touch, gesture, proximity, or hovering inputs by using an electronic pen or a user's body part. The communication interface 170, for example, can set a communication between the electronic device 101 and an external device (e.g., a first external electronic device 102, a second external electronic device 104, or a server 106). For example, the communication interface 170 can communicate with the external device (e.g., the second external electronic device 104 or the server 106) over a network 162 through wireless communication or wired communication.

The wireless communication, for example, can include cellular communication using at least one of Long Term Evolution (LTE), LTE-Advanced (LTE-A), Code Division Multiple Access (CDMA), Wideband CDMA (WCDMA), Universal Mobile Telecommunications System (UMTS), Wireless Broadband (WiBro), or Global System for Mobile Communications (GSM). The wireless communication can include, for example, at least one of Wireless Fidelity (WiFi), Bluetooth, Bluetooth Low Energy (BLE), Zigbee, Near Field Communication (NFC), magnetic secure transmission, Radio Frequency (RF), and Body Area Network (BAN). The wireless communication can include GNSS. The GNSS can include, for example, Global Positioning System (GPS), Global Navigation Satellite System (GLONASS), Beidou navigation satellite system (Beidou), or Galileo (the European global satellite-based navigation system). Hereafter, the GPS can be interchangeably used with the GNSS. The wired communication, for example, can include at least one of Universal Serial Bus (USB), High Definition Multimedia Interface (HDMI), Recommended Standard 232 (RS-232), power line communications, and Plain Old Telephone Service (POTS). The network 162 can include a telecommunications network, for example, at least one of computer network (e.g., LAN or WAN), Internet, and telephone network.

Each of the first and second external electronic devices 102 and 104 can be of the same as or of a different type from that of the electronic device 101. According to embodiments of the present disclosure, all or part of operations executed in the electronic device 101 can be executed by another electronic device or a plurality of electronic devices (e.g., the electronic device 102 or 104, or the server 106). To perform a function or service automatically or by request, instead of performing the function or the service by the electronic device 101, the electronic device 101 can request at least part of a function relating thereto from another device (e.g., the electronic device 102 or 104, or the server 106). The other electronic device (e.g., the electronic device 102 or 104, or the server 106) can perform the requested function or an additional function and send its result to the electronic device 101. The electronic device 101 can provide the requested function or service by processing the received result. In doing so, for example, cloud computing, distributed computing, or client-server computing techniques can be used.

Figure 2:
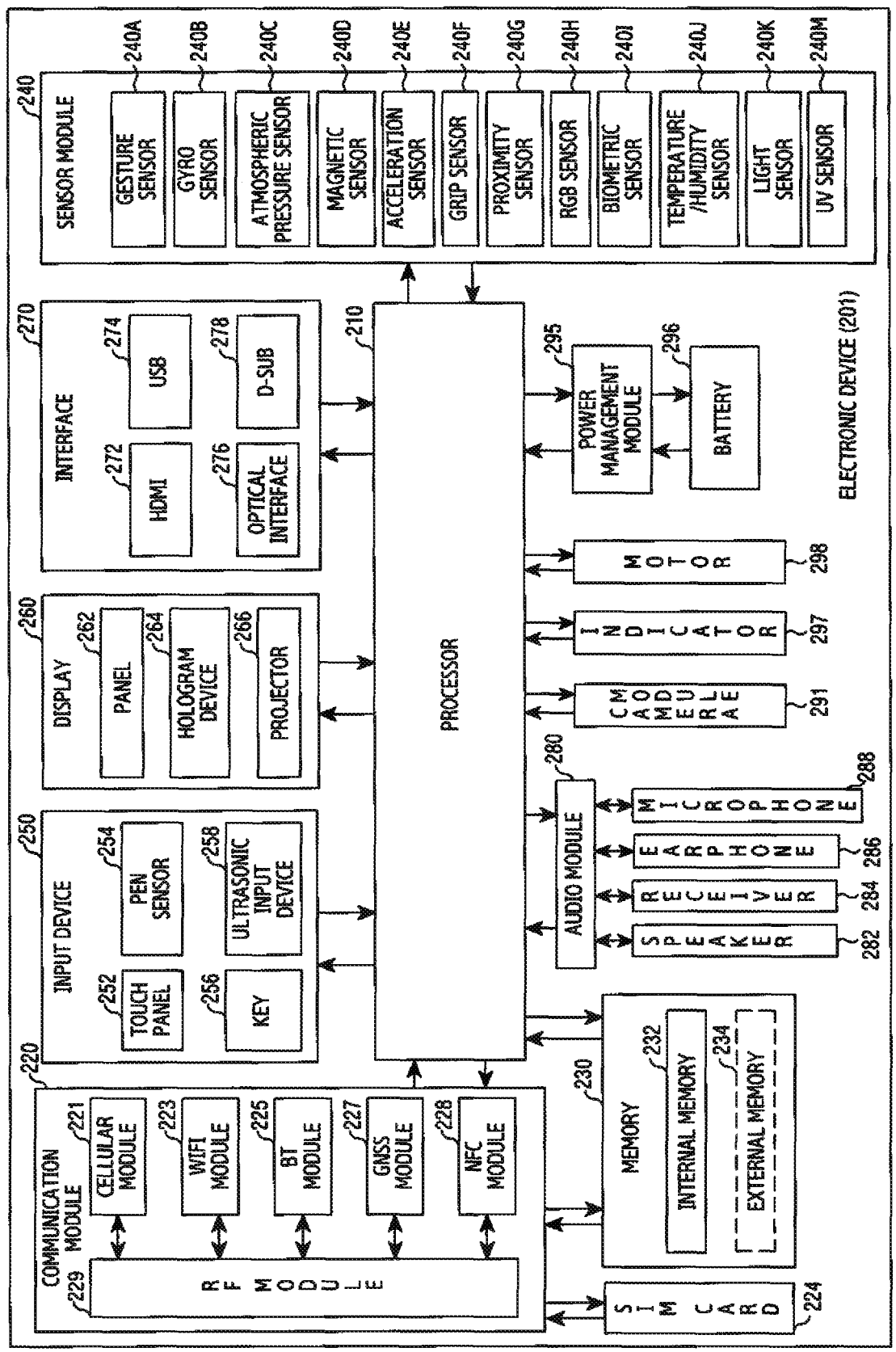
FIG. 2 illustrates a block diagram of an electronic device according to various embodiments of the disclosure.

FIG. 2 is a block diagram of an electronic device 201 according to an embodiment of the present disclosure. The electronic device 201, for example, can include all or part of the above-described electronic device 101 of FIG. 1. The electronic device 201 includes one or more processors (e.g., an AP) 210, a communication module 220, a Subscriber Identification Module (SIM) 224, a memory 230, a sensor module 240, an input device 250, a display 260, an interface 270, an audio module 280, a camera module 291, a power management module 295, a battery 296, an indicator 297, and a motor 298. The processor 210, for example, can control a plurality of hardware or software components connected to the processor 210, and also can perform various data processing and operations by executing an OS or an application program. The processor 210 can be implemented with a System on Chip (SoC), for example. The processor 210 can further include a Graphic Processing Unit (GPU) and/or an image signal processor. The processor 210 may include at least part (e.g., a cellular module 221) of the components shown in FIG. 2. The processor 210 can load commands or data received from at least one other component (e.g., a nonvolatile memory) into a volatile memory, process them, and store various data in the nonvolatile memory.

The communication module 220 can have the same or similar configuration to the communication interface 170 of FIG. 1. The communication module 220 can include, for example, the cellular module 221, a WiFi module 223, a Bluetooth (BT) module 225, a GNSS module 227, an NFC module 228, and an RF module 229. The cellular module 221, for example, can provide voice call, video call, Short Message Service (SMS), or Internet service through a communication network. The cellular module 221 can identify and authenticate the electronic device 201 in a communication network by using the SIM (e.g., a SIM card) 224. The cellular module 221 can perform at least part of a function that the processor 210 provides. The cellular module 221 can further include a CP. At least some (e.g., two or more) of the cellular module 221, the WiFi module 223, the BT module 225, the GNSS module 227, and the NFC module 228 can be included in one Integrated Circuit (IC) or an IC package. The RF module 229, for example, can transmit/receive a communication signal (e.g., an RF signal). The RF module 229, for example, can include a transceiver, a Power Amp Module (PAM), a frequency filter, a Low Noise Amplifier (LNA), or an antenna. According to another embodiment, at least one of the cellular module 221, the WiFi module 223, the BT module 225, the GNSS module 227, and the NFC module 228 can transmit/receive an RF signal through an additional RF module. The SIM 224, for example, can include a card including a SIM or an embedded SIM, and also can contain unique identification information (e.g., an Integrated Circuit Card Identifier (ICCID)) or subscriber information (e.g., an International Mobile Subscriber Identity (IMSI)).

The memory 230 (e.g., the memory 130) can include at least one of an internal memory 232 and an external memory 234. The internal memory 232 can include at least one of, for example, a volatile memory (e.g., Dynamic RAM (DRAM), Static RAM (SRAM), or Synchronous Dynamic RAM (SDRAM)), and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, flash memory, hard drive, and solid state drive (SSD)). The external memory 234 can include flash drive, for example, Compact Flash (CF), Secure Digital (SD), micro SD, mini SD, extreme digital (xD), Multi-Media Card (MMC), or memory stick. The external memory 234 can be functionally or physically connected to the electronic device 201 through various interfaces.

The sensor module 240 can, for example, measure physical quantities or detect an operating state of the electronic device 201, and thus convert the measured or detected information into electrical signals. The sensor module 240 can include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., a Red, Green, Blue (RGB) sensor), a bio sensor 240I, a temperature/humidity sensor 240J, an illumination sensor 240K, and an Ultra Violet (UV) sensor 240M. Additionally or alternately, the sensor module 240 can include an E-nose sensor, an Electromyography (EMG) sensor, an Electroencephalogram (EEG) sensor, an Electrocardiogram (ECG) sensor, an InfraRed (IR) sensor, an iris sensor, and/or a fingerprint sensor. The sensor module 240 can further include a control circuit for controlling at least one sensor therein. The electronic device, as part of the processor 210 or individually, can further include a processor configured to control the sensor module 240 and thus control the sensor module 240 while the processor 210 is sleeping.

The input device 250 can include at least one of a touch panel 252, a (digital) pen sensor 254, a key 256, and an ultrasonic input device 258. The touch panel 252 can use at least one of, for example, capacitive, resistive, infrared, and ultrasonic methods. Additionally, the touch panel 252 can further include a control circuit. The touch panel 252 can further include a tactile layer to provide a tactile response to a user. The (digital) pen sensor 254 can include, for example, part of a touch panel or a sheet for recognition. The key 256 can include, for example, a physical button, a touch key, an optical key, or a keypad. The ultrasonic input device 258 can detect ultrasonic waves from an input means through a microphone 288 and check data corresponding to the detected ultrasonic waves.

The display 260 (e.g., the display 160) can include at least one of a panel 262, a hologram device 264, a projector 266, and/or a control circuit for controlling them. The panel 262 can be implemented to be flexible, transparent, or wearable, for example. The panel 262 and the touch panel 252 can be configured with one or more modules. The panel 262 can include a pressure sensor (or a force sensor) for measuring a pressure of the user touch. The pressure sensor can be integrated with the touch panel 252, or include one or more sensors separately from the touch panel 252. The hologram device 264 can show three-dimensional images in the air by using the interference of light. The projector 266 can display an image by projecting light on a screen. The screen, for example, can be placed inside or outside the electronic device 201. The interface 270 can include, for example, an HDMI 272, a USB 274, an optical interface 276, or a D-subminiature (D-sub) 278. The interface 270 can be included in, for example, the communication interface 170 of FIG. 1. Additionally or alternately, the interface 270 can include a Mobile High-Definition Link (MHL) interface, a SD card/MMC interface, or an Infrared Data Association (IrDA) standard interface.

The audio module 280, for example, can convert sounds into electrical signals and convert electrical signals into sounds. At least some components of the audio module 280 can be included in, for example, the input/output interface 150 of FIG. 1. The audio module 280 can process sound information inputted or outputted through a speaker 282, a receiver 284, an earphone 286, or the microphone 288. The camera module 291, as a device for capturing still images and videos, can include one or more image sensors (e.g., a front sensor or a rear sensor), a lens, an Image Signal Processor (ISP), or a flash (e.g., an LED or a xenon lamp). The power management module 295, for example, can manage the power of the electronic device 201. According to an embodiment of the present disclosure, the power management module 295 can include a Power Management IC (PMIC), a charger IC, or a battery or fuel gauge, for example. The PMIC can have a wired and/or wireless charging method. The wireless charging method can include, for example, a magnetic resonance method, a magnetic induction method, or an electromagnetic method, and can further include an additional circuit for wireless charging, for example, a coil loop, a resonant circuit, or a rectifier circuit. The battery gauge can measure the remaining capacity of the battery 296, or a voltage, current, or temperature of the battery 296 during charging. The battery 296 can include, for example, a rechargeable battery and/or a solar battery.

The indicator 297 can display a specific state of the electronic device 201 or part thereof (e.g., the processor 210), for example, a booting state, a message state, or a charging state. The motor 298 can convert electrical signals into mechanical vibration and generate a vibration or haptic effect. The electronic device 201 can include a mobile TV supporting device (e.g., a GPU) for processing media data according to standards such as Digital Multimedia Broadcasting (DMB), Digital Video Broadcasting (DVB), or MediaFLOW™. Each of the above-described components of the electronic device can be configured with at least one component and the name of a corresponding component can vary according to the kind of an electronic device. According to an embodiment of the present disclosure, an electronic device (e.g., the electronic device 201) can be configured to include at least one of the above-described components or an additional component, or to not include some of the above-described components. Additionally, some of components in an electronic device are configured as one entity, so that functions of previous corresponding components are performed identically.

Figure 3:
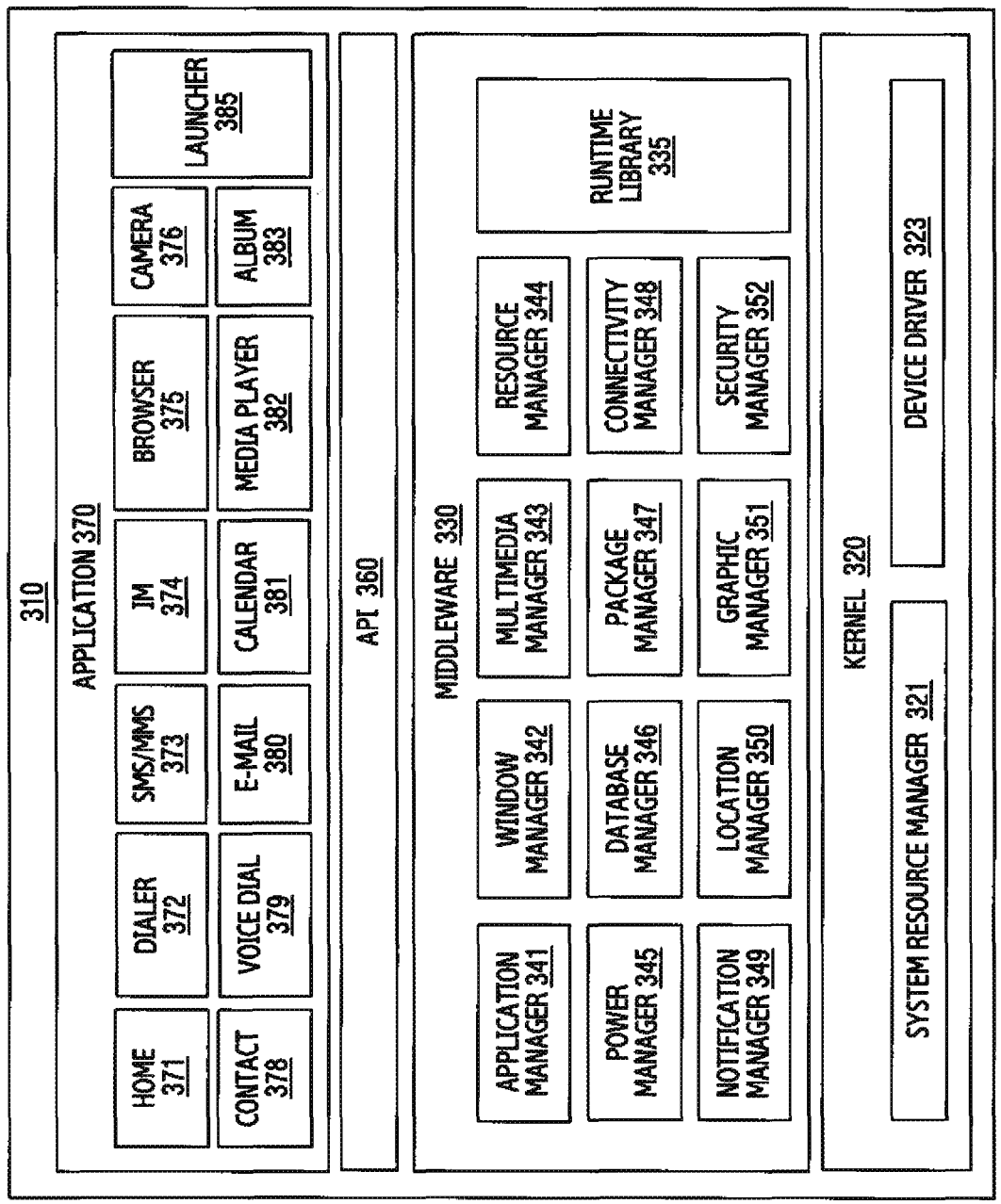
FIG. 3 illustrates a block diagram of a program module according to various embodiments of the disclosure.

FIG. 3 is a block diagram of a program module according to an embodiment of the present disclosure. A program module 310 (e.g., the program 140) can include an OS for controlling a resource relating to an electronic device (e.g., the electronic device 101) and/or various applications (e.g., the application program 147) running on the OS. The OS can include, for example, Android™, iOS™, Windows™, Symbian™, Tizen™, or Bada™. Referring to FIG. 3, the program module 310 can include a kernel 320 (e.g., the kernel 141), a middleware 330 (e.g., the middleware 143), an API 360 (e.g., the API 145), and/or an application 370 (e.g., the application program 147). At least part of the program module 310 can be preloaded on an electronic device or can be downloaded from an external electronic device (e.g., the electronic device 102, 104, or the server 106).

The kernel 320 includes, for example, at least one of a system resource manager 321 and/or a device driver 323. The system resource manager 321 can control, allocate, or retrieve a system resource. According to an embodiment, the system resource manager 321 can include a process management unit, a memory management unit, or a file system management unit. The 2C device driver 323 can include, for example, a display driver, a camera driver, a Bluetooth driver, a sharing memory driver, a USB driver, a keypad driver, a WiFi driver, an audio driver, or an Inter-Process Communication (IPC) driver. The middleware 330, for example, can provide a function commonly required by the application 370, or can provide various functions to the application 370 through the API 360 in order to allow the application 370 to efficiently use a limited system resource inside the electronic device. The middleware 330 includes at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 can include, for example, a library module used by a complier to add a new function through a programming language while the application 370 is running. The runtime library 335 can manage input/output, manage memory, or arithmetic function processing. The application manager 341, for example, can manage the life cycle of the applications 370. The window manager 342 can manage a GUI resource used in a screen. The multimedia manager 343 can recognize a format for playing various media files and encode or decode a media file by using the codec in a corresponding format. The resource manager 344 can manage a source code of the application 3740 or a memory space. The power manager 345 can manage the capacity or power of the battery and provide power information for an operation of the electronic device. The power manager 345 can operate together with a Basic Input/Output System (BIOS). The database manager 346 can create, search, or modify a database used in the application 370. The package manager 347 can manage installation or updating of an application distributed in a package file format.

The connectivity manger 348 can manage, for example, a wireless connection. The notification manager 349 can provide an event, such as incoming messages, appointments, and proximity alerts, to the user. The location manager 350 can manage location information of an electronic device. The graphic manager 351 can manage a graphic effect to be provided to the user or a user interface relating thereto. The security manager 352 can provide, for example, system security or user authentication. The middleware 330 can include a telephony manager for managing a voice or video call function of the electronic device, or a middleware module for combining various functions of the above-described components. The middleware 330 can provide a module specialized for each type of OS. The middleware 330 can dynamically delete part of the existing components or add new components. The API 360, as a set of API programming functions, can be provided as another configuration according to the OS. For example, Android or iSO can provide one API set for each platform, and Tizen can provide two or more API sets for each platform.

The application 370 can include at least one of a home 371, a dialer 372, an SMS/Multimedia Messaging System (MMS) 373, an Instant Message (IM) 374, a browser 375, a camera 376, an alarm 377, a contact 378, a voice dial 379, an e-mail 380, a calendar 381, a media player 382, an album 383, a clock 384, health care (e.g., measure an exercise amount or blood sugar level), or environmental information (e.g., air pressure, humidity, or temperature information) provision application. The application 370 can include an information exchange application for supporting information exchange between the electronic device and an external electronic device. The information exchange application can include, for example, a notification relay application for relaying specific information to the external device or a device management application for managing the external electronic device. For example, the notification relay application can relay notification information from another application of the electronic device to an external electronic device, or receive and forward notification information from an external electronic device to the user. The device management application, for example, can install, delete, or update a function (e.g., turn-on/turn off of the external electronic device itself (or some components) or display brightness (or resolution) adjustment) of an external electronic device communicating with the electronic device, or an application operating in the external electronic device. The application 370 can include a specified application (e.g., a health care application of a mobile medical device) according to a property of the external electronic device. The application 370 can include an application received from an external electronic device. According to one embodiment, the launcher application 385 may provide a function to assist to run another application. For example, the electronic device 101 may include a plurality of applications, the launcher application 385 can help to select the application that the user wants to run, by showing and listing the execution icons of a plurality of applications. In some embodiments, the launcher application 385 may display a plurality of applications installed in the electronic device 101 in the form of an icon consisting of an image and text. In addition, the electronic device 101 may have a display 160 of a limited size, it may not be possible to display all the applications installed in the electronic device 101 on a single screen. In this case, the launcher application 385 may generate multiple layers in order to display all the applications installed. In addition, if a plurality of layers are present, the launcher application 385 can be expressed a plurality of layers in a stacked structure. In some embodiments, the launcher application 385 may perform functions such as home 371 applications. In this case, the user of the electronic device 101 may select a program that is executed by default from the launcher 385 or home 371 application.

At least part of the program module 310 can be implemented (e.g., executed) with software, firmware, hardware (e.g., the processor 210), or a combination of at least two of them, and include a module, a program, a routine, a set of instructions, or a process for executing one or more functions.

As described above, the electronic device according to various embodiments may display multiple layers, and may effectively display a layer through predetermined processing. The disclosure may be applied to all electronic devices each having a Graphical User Interface (hereinafter "GUI"), including a smart phone, a Personal Digital Assistant (PDA), a laptop computer, and the like. However, for concreteness of the following description, a smart phone is presented as an example of all electronic devices each having a GUI. However, the various embodiments described below may also be applied to other electronic devices each having a GUI.

Figure 4:
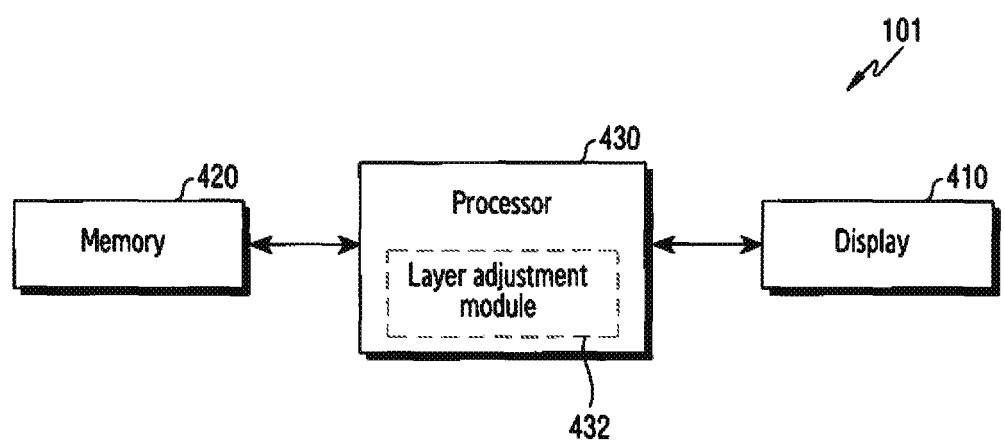
FIG. 4 illustrates a functional configuration of an electronic device according to various embodiments of the disclosure.

FIG. 4 illustrates a functional configuration of an electronic device according to various embodiments of the disclosure. The term " . . . unit", the term ending with the suffix " . . . or" or " . . . er", or the like, which is used below, may signify a unit of processing at least one function or operation, and this configuration may be implemented in hardware, software, or as a combination of hardware and software.

Referring to FIG. 4, the electronic device 101 according to an embodiment of the disclosure may include a display 410, a memory 420, and a processor 430. The processor 430 may include a layer adjustment module 432. In this configuration, the layer adjustment module 432 is an instruction set or code stored in the memory 420, and may be: the instructions/code resided in the processor 430 at least temporarily; a space having the instructions/code stored therein; or a part of a circuitry constituting the processor 430.

The display 410 according to an embodiment of the disclosure may be an apparatus for screen display of the electronic device 101. For example, the display 410 may be implemented by at least one of an Organic Light-Emitting Diode (OLED), a Quantum-dot Light-Emitting Diode (QLED), and a Liquid Crystal Display (LCD). The display 410 may be an element corresponding to the display 160 of FIG. 1 or the display 260 of FIG. 2.

The memory 420 according to an embodiment of the disclosure stores a basic program for operating the electronic device 101, an application program, and data such as configuration information. The memory 420 may be implemented by a volatile memory, a non-volatile memory, or a combination of a volatile memory and a non-volatile memory. Further, the memory 420 provides the stored data in response to a request of the processor 430.

The processor 430 according to an embodiment of the disclosure controls an overall operation of the electronic device 101. For example, the processor 430 may control screen display of the display 410. The processor 440 may include the processor 120 of FIG. 1 or the processor 210 of FIG. 2. According to an embodiment, the processor 430 may include or may not include a Graphics Processing Unit (GPU). Further, the processor 430 may include the layer adjustment module 432.

The layer adjustment module 432 according to an embodiment of the disclosure controls an operation of displaying layers. In order to display a layer on the display 410, the layer adjustment module 432 may configure, in a frame buffer, pixels constituting a layer and may output the pixels, generated in the memory 420, through the display 410. Further, the layer adjustment module 432 may change a transparency level value of each layer. In some embodiments, a value of a transparency level adjusted by the layer adjustment module 432 may be stored together with pixel input Red-Green-Blue (RGB) values for display on the display 410, and when the value of the transparency level is stored together with the pixel input RGB values, configuration information related to the transparency level may have an Alpha-Red-Green-Blue (ARGB) format. In the ARGB format, an alpha value may refer to data related to a transparency level among format data for display on the display 410. In some embodiments, the layer adjustment module 432 may not exist, and in this embodiment, may be integrated into a processor or a GPU. In this embodiment, a transparency level value may be determined in a range of 0 to 100. A transparency level value in a case of being completely transparent may be 100, and a transparency level value in a case of being completely opaque may be 0. When a transparency level value in the case of being able to be completely transparently seen is 100, an alpha value in a corresponding ARGB format may be 0. In another embodiment, an alpha value in a case of being completely transparent may be 0, and an alpha value in a case of being completely opaque may be 100.

Figure 5A:
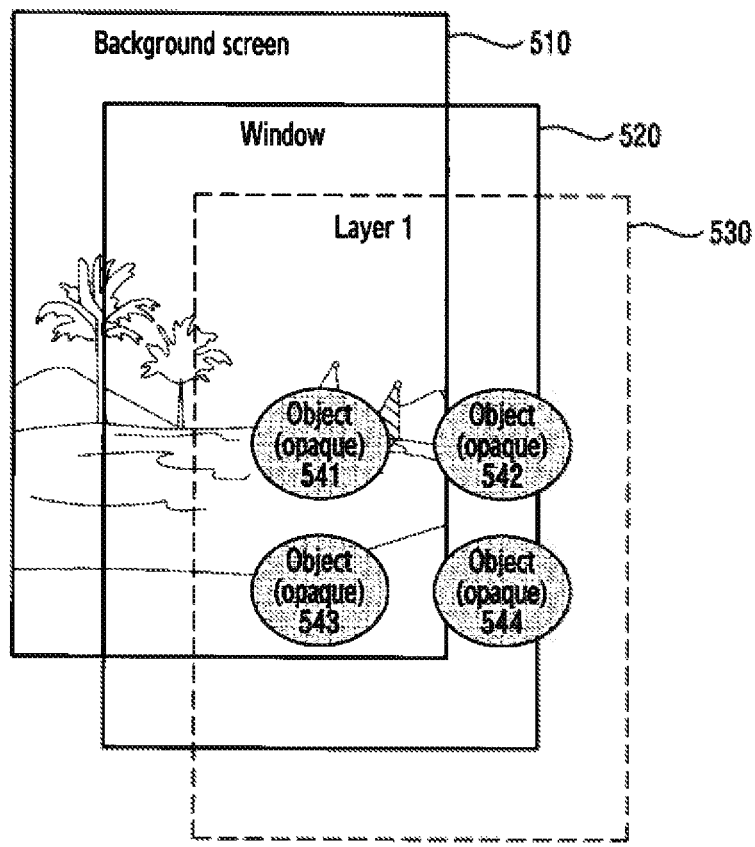
FIG. 5A illustrates examples of screen constituent elements in an electronic device according to various embodiments of the disclosure.
Figure 5B:
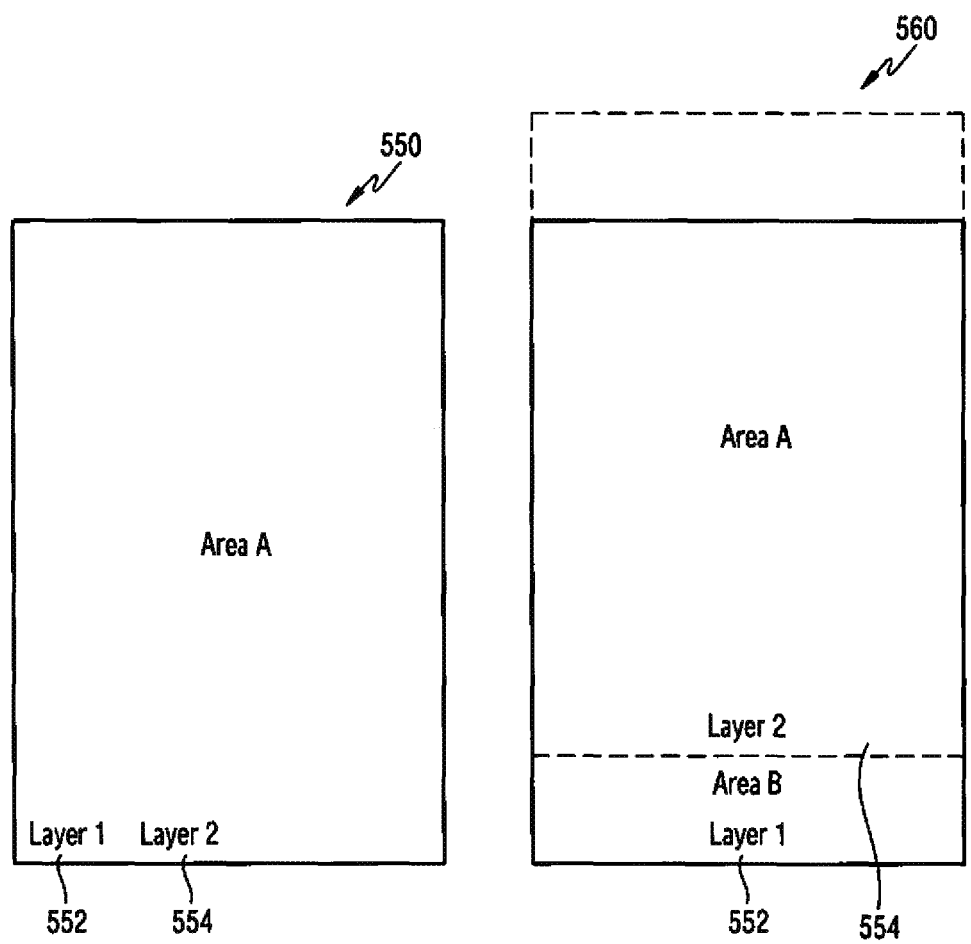
FIG. 5B illustrates movement of a layer in an electronic device according to various embodiments of the disclosure.

In the configuration of the electronic device 101 described with reference to FIG. 4, the processor 430 and/or the layer adjustment module 432 may be employed to display multiple layers. When a layer is displayed through a series of processings, the concept of constituent elements and an overlapping area (an overlay area), which can be displayed on the display 410 of the electronic device 101, will be described in detail below with reference to FIGS. 5A and 5B. FIGS. 5A and 5B illustrate examples of configurations which can be displayed on the display 410 in the electronic device 101 according to various embodiments of the disclosure.

According to various embodiments of the disclosure, an electronic device may include a display and a processor. The processor may display, on the display, a first layer, at least a part of which is transparent, and a second layer, at least a partial area of which overlaps the first layer and which is disposed at a lower end of the first layer. At least a part of the second layer may be configured to be transparently displayed.

According to an embodiment of the disclosure, the processor may be configured to: configure the at least the part so as not to be drawn in the second layer; and display a remaining part except for the at least the part in the second layer. Alternatively, the processor may be configured to: set, to a value representing transparency or translucency, a transparency level of the at least the part in the second layer; and display the second layer according to the transparency level.

According to an embodiment of the disclosure, a remaining part except for the at least the part in the second layer may be opaquely displayed. Alternatively, the remaining part except for the at least the part in the second layer may have a transparency level adjusted according to a ratio of the remaining part relative to the second layer.

According to an embodiment of the disclosure, each of the first layer and the second layer may include at least one object, and the at least one object may include an execution icon or a widget of an application. Further, the first layer may have a transparency level adjusted according to a ratio of the remaining part relative to the second layer.

According to an embodiment of the disclosure, the first layer and the second layer may be generated by a launcher application, and may be displayed in a transparent window.

FIG. 5A illustrates examples of screen constituent elements in an electronic device according to various embodiments of the disclosure. Constituent elements which can be displayed on the display 410 may include a background screen 510, a window 520, a layer 530, and objects 541 to 544.

The background screen 510 may be generated by the middleware 330. For example, when a launcher application 385 is used, the background screen 510 may be drawn as a background at a lower end part of a layer. Specifically, the electronic device 101 may configure a layer in a unit of pixel in a frame buffer through rasterization of an image of a displayed layer, and may output the pixels, generated in the memory 420, through the display 410. Further, the background screen 510 may be changed and deleted according to a user's configuration.

The window 520 according to an embodiment of the disclosure may be defined as a predetermined space generated according to execution of an application. That is, when an application is executed according to a user input, the electronic device 101 may generate a predetermined space referred to as a "window", and may configure a screen for the relevant application in the space. In some embodiments, each application may control, through configuration of an attribute of a window, such that any image or any color distinguished from the background screen 510 is displayed through the window. In another embodiment, in order to always show a background screen, the launcher application 385 may configure an attribute of a window so as to be completely transparent. Therefore, the user may view the background 330 screen 510 through the transparent window. Further, the objects 541 to 544 are opaque, and as a result, the user may view the background screen 510 and the objects 541 to 544.

The layer 530 according to an embodiment of the disclosure may be defined as a frame for arrangement of the objects 541 to 544. In an embodiment, the layer 530 may be moved, and the objects 541 to 544 included in the layer 530 may be moved together according to the movement of the layer 530. The layer 530 may have a unique identifier (ID), and when multiple layers exist, the respective layers may have different IDs. In another embodiment, the processor 430 and/or the layer adjustment module 432 may differently process layers by making 4 reference to an ID of each of the layers. In some embodiments, different processings of layers may include an operation of setting transparency levels of the layers to different values. Further, the different processings of the layers may include an operation of differently configuring whether the respective layers are to be displayed, according to the respective layers. Further, in another embodiment, the launcher application 385 may adjust a transparency level, and thus may display layers so that the layers overlap each other or an upper end layer completely covers a lower end layer.

The objects 541 to 544 according to an embodiment of the disclosure may be interface constituent elements configured to perform a particular function. In some embodiments, each of the objects 541 to 544 may be implemented by at least one of an image, text, and a widget. For example, each of the objects 541 to 544 may be an icon configured to display an application or a widget configured to perform a function of an application. In an embodiment, the objects 541 to 544 may be configured to be opaque.

As described above, in the electronic device 101 described with reference to FIG. 5A, the screen constituent elements may be divided into the background screen 510, the window 520, the layer 530, and the objects 541 to 544. However, the scope of the disclosure is not limited by the specific division. That is, the window 520, the layer 530, and the objects 541 to 544 may all be understood as the same concept (e.g., a window).

FIG. 5B illustrates movement of a layer in an electronic device according to various embodiments of the disclosure. FIG. 5B illustrates the concept of an overlapping area when multiple layers overlap each other.

Referring to FIG. 5B, two layers, that is, a layer 1 552 and a layer 2 554, may exist. Cases in which the layer 1 552 overlaps the layer 2 554 may be divided into a case 550 in which an entire area of the former overlaps that of the latter and, and a case 560 in which a partial area of the former overlaps that of the latter. Further, referring to FIG. 5B, area A may represent an area in which the layers overlap each other (hereinafter "overlapping area"), and area B may represent an area in which the layers do not overlap each other (hereinafter "non-overlapping area").

In a case 550 in which the entire areas overlap each other, an overlapping area may correspond to an entirety of the layer 1 552. In this example, a non-overlapping area does not exist. In a case 560 in which the partial areas overlap each other, an overlapping area (e.g., area A) and a non-overlapping area (e.g., area B) may exist. In an embodiment, the case 560, in which the partial areas overlap each other, may represent an instant during a switching process of a layer according to a user's swipe input. In another embodiment, the case 560, in which the partial areas overlap each other, may be a situation occurring due to the difference between positions at, or sizes with, which the layer 1 552 and the layer 2 554 are displayed.

A size of at least one of the layer 1 552 and the layer 2 554 may be identical to, or different from, that of a window. In some embodiments, when one of the layer 1 552 and the layer 2 554 has a size smaller than that of a window, area A in the case 550 in which the entire areas overlap each other may be a part of the window.

As described above, the electronic device 101 may display at least one layer. According to the circumstances, multiple layers may overlap as illustrated in FIG. 5B. Objects included in an upper end layer may be opaque, but the upper end layer may be transparent. In this example, objects included in a lower end layer may be seen through a transparent part of the upper end layer. In this example, the objects may be seen to overlap each other, and thus visibility may be reduced.

Therefore, the following various embodiments adjust a transparency level of a layer located at a lower end, and thus can prevent a reduction in visibility due to overlapping of objects. In various embodiments of the disclosure, adjustment of a value of a transparency level of a layer may be understood as adjusting a value of a transparency level of an entirety of a layer including objects.

Figure 6A:
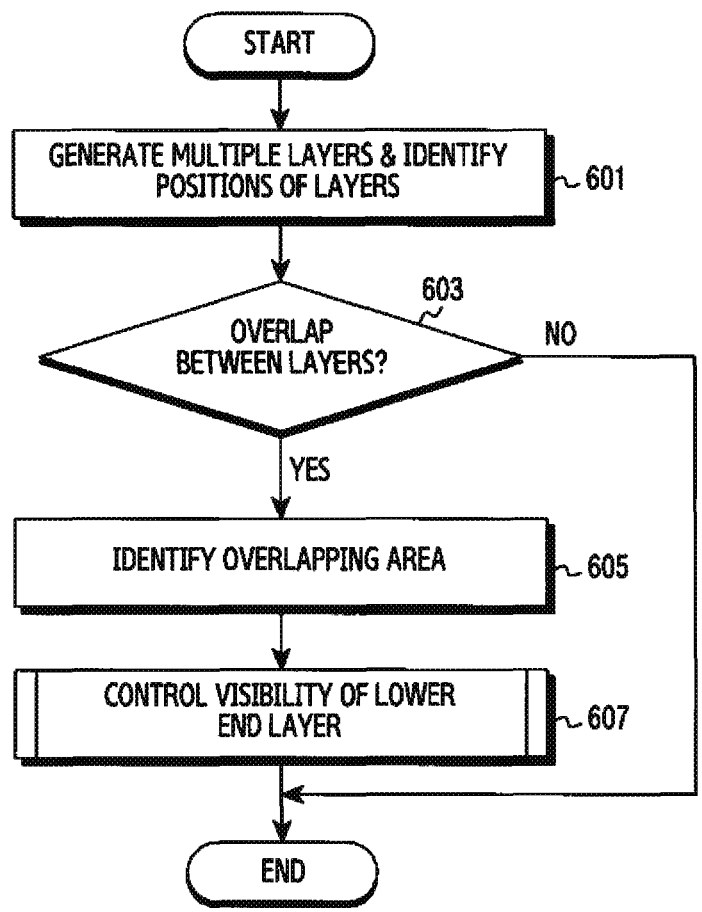
FIG. 6A is a flowchart illustrating adjustment of a layer in an electronic device according to various embodiments of the disclosure.

FIG. 6A is a flowchart illustrating adjustment of a layer in an electronic device according to various embodiments of the disclosure. FIG. 6A illustrates an example of an operating method of the electronic device 101.

Referring to FIG. 6A, in operation 601, the electronic device 101 (e.g., the processor 430) may generate multiple layers, and may identify a position of each of the layers. In other words, the processor 430 may identify the number of necessary layers or a position of each of the layers, according to a configuration of an application. For example, when a user executes a launcher application 385, the processor 430 may identify how many pages are necessary, and may determine the number of necessary layers, a size of each of the layers, or a position of each of the layers. In some embodiments, as illustrated in FIG. 5B, multiple layers may include the layer 1 550 and the layer 2 560. In another embodiment, multiple layers may include at least three layers.

Figure 6B:
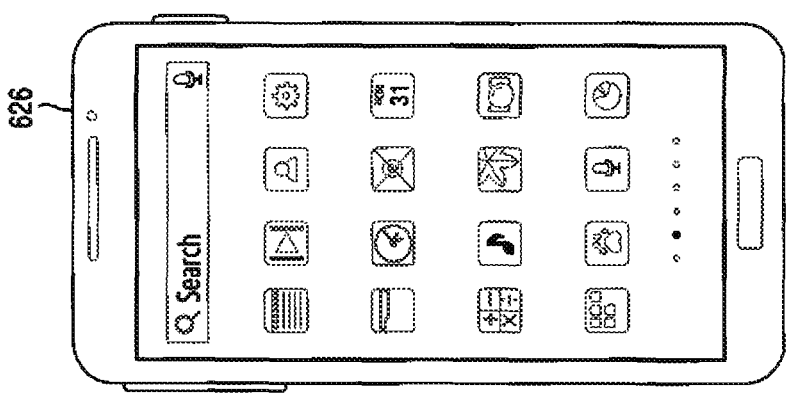
FIG. 6B illustrates an example of layer switching according to up/down movement of a layer in an electronic device according to various embodiments of the disclosure.
Figure 6B:
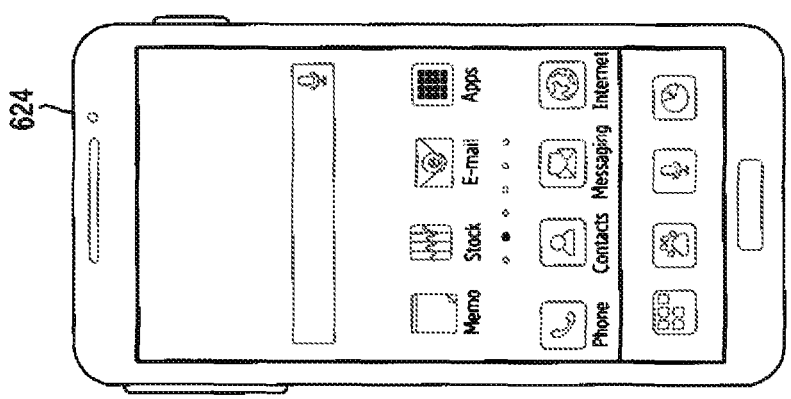
Figure 6B:
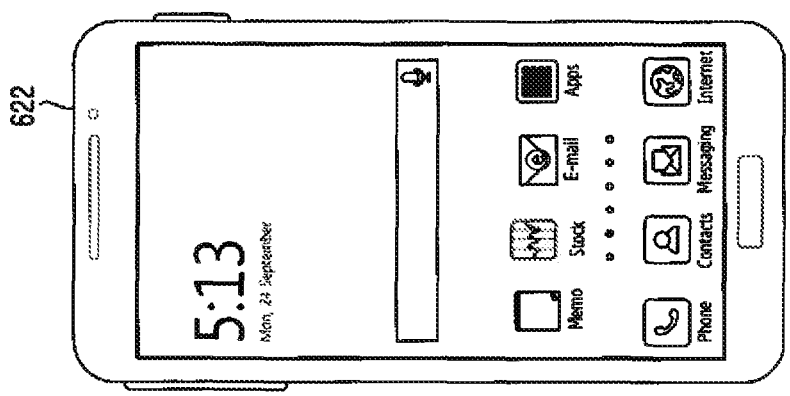
Figure 6C:
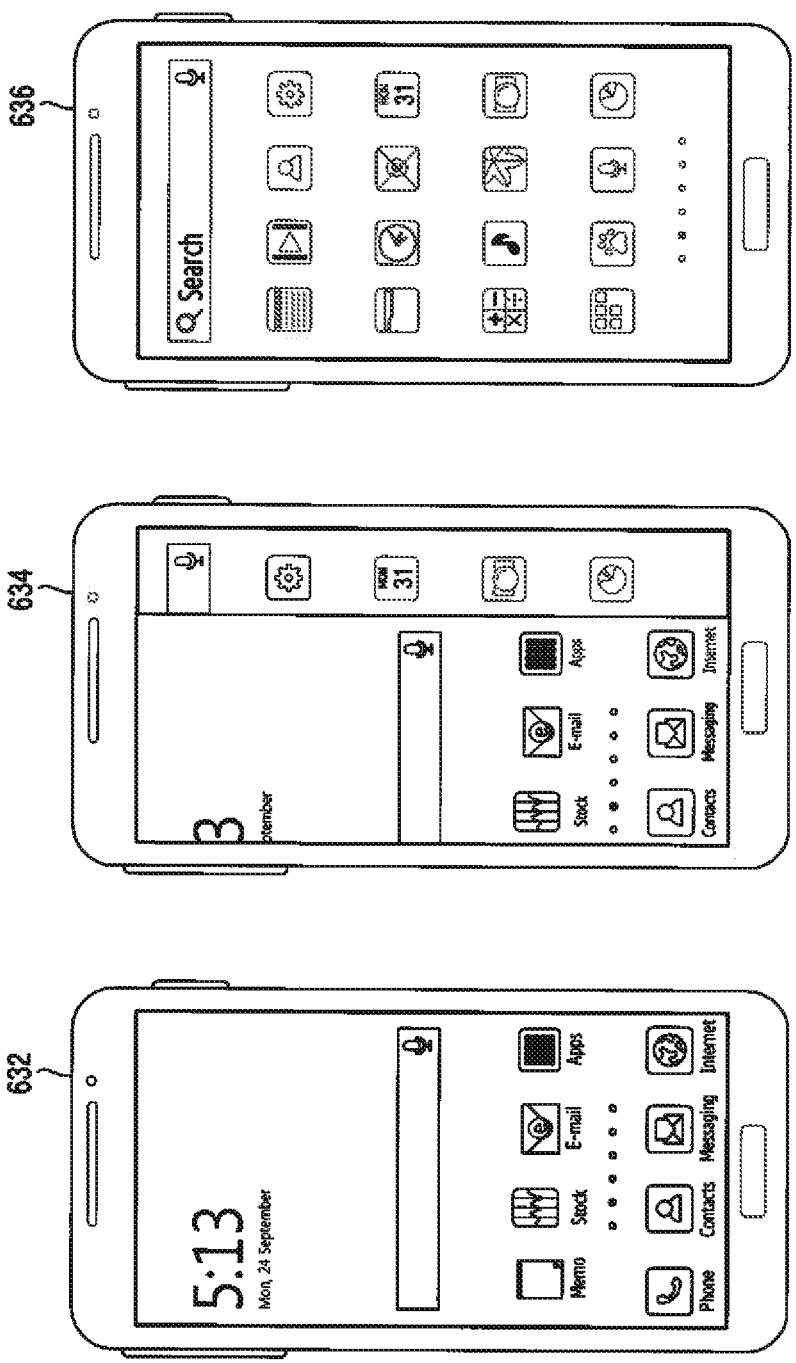
FIG. 6C illustrates an example of layer switching according to left/right movement of a layer in an electronic device according to various embodiments of the disclosure.

In this example, each layer may be moved, and thus a position of each layer may be changed. For example, a layer may be moved according to the user's touch input (e.g., swipe). For example, referring to FIG. 6B, an upper end layer may be moved up and down sequentially as in the case of a screen 622, a screen 624, and a screen 626, according to the user's swipe input. As another example, referring to FIG. 6C, an upper end layer may be moved to the left and right sequentially as in the case of a screen 632, a screen 634, and a screen 636, according to the user's swipe input. Due to the movement of the upper end layer, switching between layers may be performed. A layer may be moved in a direction other than the directions illustrated as examples in FIGS. 6B and 6C.

In operation 603, the electronic device 101 may determine whether overlap between layers occurs. That is, the electronic device 101 may determine whether overlapping layers exist, on the basis of the number of the layers, the sizes thereof, and the positions thereof identified in operation 601. In some embodiments, the processor 430 may compare between areas occupied by the respective layers on the basis of the information acquired in operation 601, and when a common area exists, may determine that overlap between layers has occurred. When the overlap between the multiple layers has not occurred, the processor 430 may terminate the procedure.

When the overlap between the multiple layers has occurred, in operation 605, the electronic device 101 may identify an overlapping area. In other words, when it is determined that the overlap exists, the processor 430 may calculate a specific area, and thus may detect the position and the size of the overlapping area. In some embodiments, specifically, the processor 430 may calculate common coordinates between pixels constituting the layers, and thus may detect an overlapping area. In another embodiment, the processor 430 may compare between pieces of start point information of respective layers or pieces of size information thereof, and thus may detect an overlapping area.

In operation 607, the electronic device 101 may control the visibility of a lower end layer. That is, after calculating the overlapping area between the layers in operation 605, the processor 430 may additionally process the lower end layer in the overlapping area. In various embodiments, the processor 430 may process the lower end layer so that the lower end layer is not visible or is seen blurred (e.g., blurring processing) in the overlapping area.

According to various embodiments of the disclosure, an operating method of an electronic device may include: displaying a first layer, at least a part of which is transparent, on a display; and displaying a second layer, at least a part of which overlaps the first layer and which is disposed at a lower end of the first layer, on the display. In the operating method, the at least the part of the second layer may be configured to be transparently displayed.

In the operating method, the displaying of the second layer may include: configuring the at least the part so as not to be drawn in the second layer; and displaying a remaining part except for the at least the part in the second layer. Alternatively, the displaying of the second layer may include: setting, to a value representing transparency or translucency, a transparency level of the at least the part in the second layer; and displaying the second layer according to the transparency level.

According to an embodiment of the disclosure, a remaining part except for the at least the part in the second layer may be opaquely displayed. Further, the remaining part except for the at least the part in the second layer may have a transparency level adjusted according to a ratio of the remaining part relative to the second layer.

According to an embodiment of the disclosure, each of the first layer and the second layer may include at least one object, and the at least one object may include an execution icon or a widget of an application. Further, the first layer may have a transparency level adjusted according to a ratio of the remaining part relative to the second layer.

According to an embodiment of the disclosure, the first layer and the second layer may be generated by a launcher application, and may be displayed in a transparent window.

As described with reference to FIG. 6A, when the multiple layers overlap each other, the visibility of at least a part of the lower end layer may be controlled. Therefore, a part corresponding to an overlapping area in the lower end layer is expressed to be invisible or blurred, and thus the user can easily recognize an object and a background screen included in an upper end layer. The visibility of the lower end layer may be controlled according to various schemes. Hereinafter, more specific embodiments for controlling visibility will be described with reference to FIGS. 7 and 8.

Figure 7:
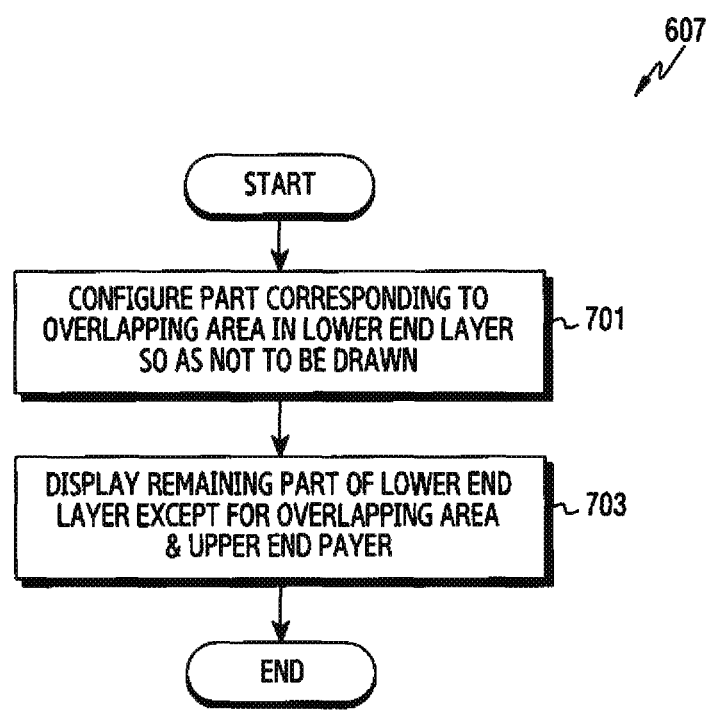
FIG. 7 is a flowchart illustrating adjustment of a layer through not drawing a lower end layer in an electronic device according to various embodiments of the disclosure.

FIG. 7 is a flowchart illustrating adjustment of a layer in an electronic device according to various embodiments of the disclosure. FIG. 7 illustrates an example of an operating method of the electronic device 101.

Referring to FIG. 7, in operation 701, the electronic device 101 (e.g., the processor 430) may configure a part corresponding to an overlapping area in a lower end layer so as not to be drawn. That is, the processor 430 may designate a function, which is not applied to another layer but is applied to only the lower end layer, by making reference to a unique ID that the lower end layer has. In some embodiments, the processor 430 may control such that a layer except for the lower end layer is displayed using a draw function. Further, the processor 430 may configure a draw function so as not to be input for only the lower end layer.

In operation 703, the electronic device 101 may display a remaining part of the lower end layer except for the overlapping area, or an upper end payer. That is, the processor 430 may display, on a display, an upper end layer of the overlapping area or an upper end layer of a non-overlapping area. In this example, when at least three layers overlap each other, an upper end layer of an overlapping area may be different from an upper end layer of a non-overlapping area. Specifically, the upper end layer of the non-overlapping area may be a lower end layer of the overlapping area. Therefore, the processor 430 may configure the lower end layer of the overlapping area so as not to be shown on the display 410.

Figure 8:
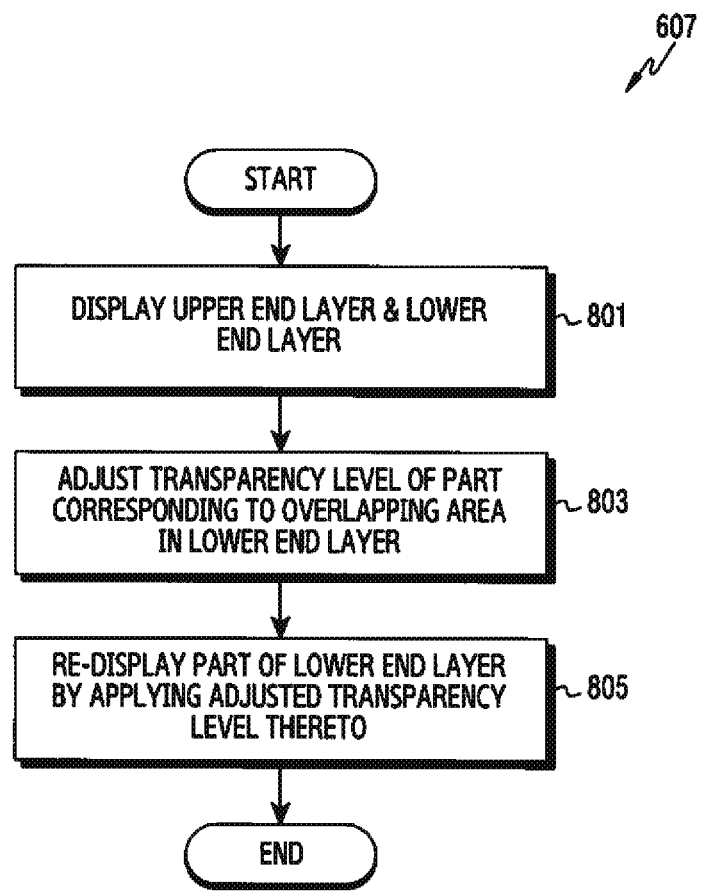
FIG. 8 is a flowchart illustrating adjustment of a layer using a transparency level value of a lower end layer in an electronic device according to various embodiments of the disclosure.

FIG. 8 is a flowchart illustrating adjustment of a layer in an electronic device according to various embodiments of the disclosure. FIG. 8 illustrates an example of an operating method of the electronic device 101.

Referring to FIG. 8, in operation 801, the processor 430 may display an upper end layer and a lower end layer on the display 410. In this example, since a transparency level value of the lower end layer is not yet adjusted, the processor 430 may display each layer without distinguishing between an overlapping area of the upper end layer and an overlapping area of the lower end layer. Therefore, all objects of each layer may be displayed.

In operation 803, the electronic device 101 may adjust a transparency level value of the lower end layer relative to the overlapping area. That is, the processor 430 may set a transparency level value of the lower end layer in the overlapping area. In some embodiments, the processor 430 may set a transparency level value of a part corresponding to the overlapping area in the lower end layer, to a value representing complete transparency (e.g., a transparency level value=100). In this example, a layer may be expressed as in a case where only the upper end layer exists. In another embodiment, the processor 430 may set a transparency level value of a part corresponding to the overlapping area in the lower end layer, to a value representing translucency (e.g., a transparency level value=50). In this example, a user may recognize existence of the lower end layer in a range in which visibility of the upper end layer is not greatly reduced. When an ARGB format is used to configure a transparency level, the processor 430 may change only A value and may maintain RGB values.

In operation 805, the electronic device 101 may re-display the part corresponding to the overlapping area in the lower end layer on the basis of the adjusted transparency level value. That is, the processor 430 may display, in operation 801, objects of the upper end layer and the lower end layer so as to be all opaque, and then may re-display, in operation 805, the part of the lower end layer on the basis of the adjusted transparency level value, so that the objects having been opaquely displayed in the lower end layer can be expressed to be completely transparent or translucent. That is, the processor 430 may opaquely display the objects of the upper end layer, and may transparently or translucently display the objects of the lower end layer. Therefore, it is advantageous in that the visibility of the upper end layer can be improved.

As in the embodiments described with reference to FIGS. 7 and 8, visibility of the lower end layer may be controlled. As a result, the visibility of the entire screen can be improved. In the embodiment described with reference to FIG. 8, an adjusted transparency level is first applied to a displayed lower end layer. However, in another embodiment, before being displayed, a transparency level may be first adjusted. In this example, operation 801 of FIG. 8 may be omitted.

In the above-described embodiments, control of a lower end layer may depend on distinguishing between an overlapping area and a non-overlapping area. In order to provide a more improved user experience, the electronic device 101 may change a transparency level according to a size change of an overlapping area or a non-overlapping area. In this example, the user can experience a fade-in effect or a fade-out effect. Hereinafter, a description will be made of an embodiment for a fade-in effect or a fade-out effect.

Figure 9A:
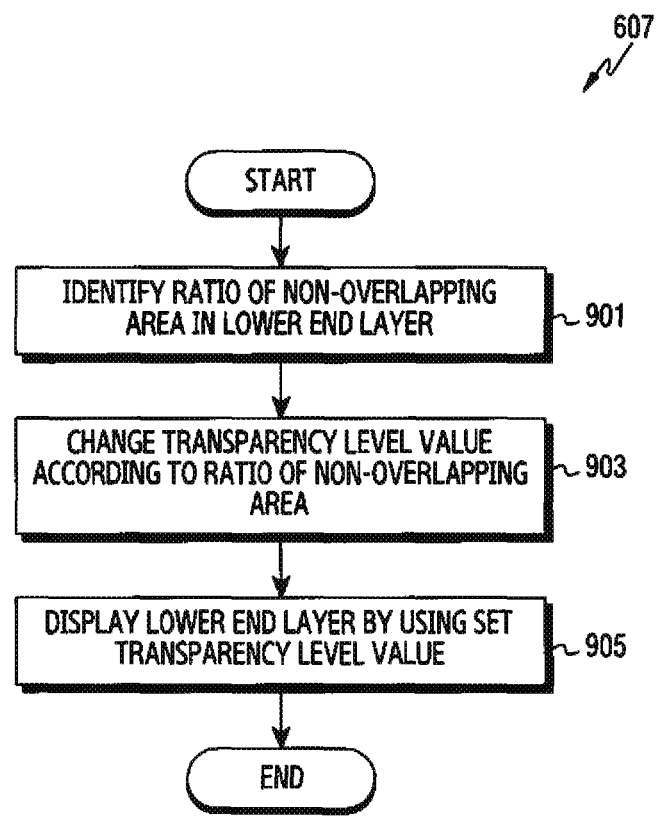
FIG. 9A is a flowchart illustrating provision of a fade-in effect during layer switching in an electronic device according to various embodiments of the disclosure.

FIG. 9A is a flowchart illustrating provision of a fade-in effect during layer switching in an electronic device according to various embodiments of the disclosure.

Figure 9B:
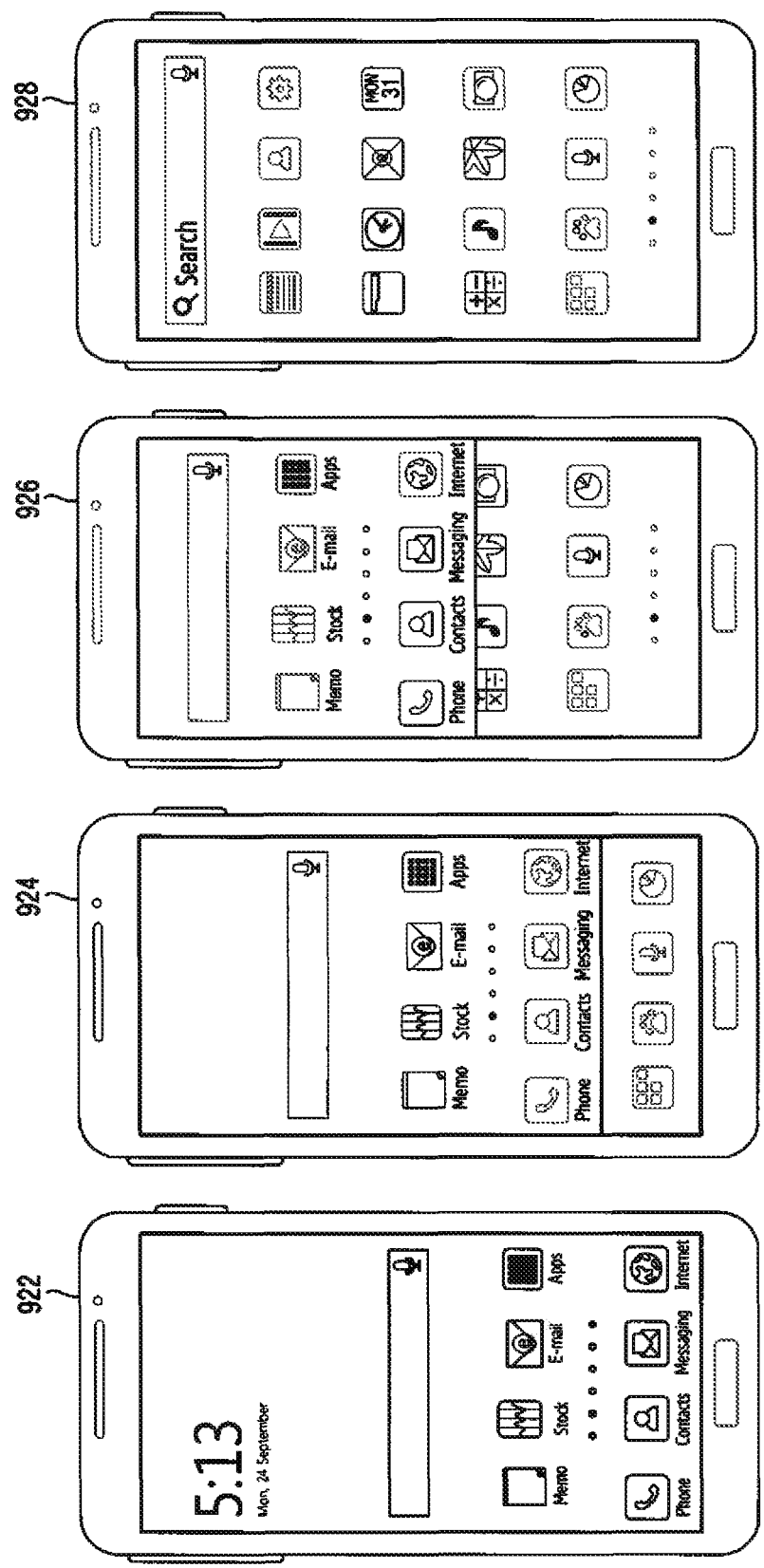
FIG. 9B illustrates an example of a screen on which layers are switched together with a fade-in effect in an electronic device according to various embodiments of the disclosure.

Referring to FIG. 9A, in operation 901, the electronic device 101 may identify a ratio of a non-overlapping area in a lower end layer. The processor 430 may calculate a ratio of a non-overlapping area by using pre-acquired information on an overlapping area. In this example, the ratio of the non-overlapping area may be changed according to movement of an upper end layer. For example, referring to FIG. 9B, ratios of non-overlapping areas on a first screen 922, a second screen 924, a third screen 926, and a fourth screen 928 may be different from each other according to a position of an upper end layer.

In operation 903, the electronic device 101 may change a transparency level value according to the ratio of the non-overlapping area. In other words, according to an increase in the ratio of the non-overlapping area, the processor 430 may change a transparency level value so that the lower end layer becomes more opaque. In this example, an increase in the ratio of the non-overlapping area may signify a situation in which the lower end layer is switched to an upper end layer according to switching of the upper end layer.

In operation 905, the electronic device 101 may display the lower end layer by using the changed transparency level value. That is, the processor 430 may display the lower end layer according to the transparency level value having been set in operation 1003. For example, referring to FIG. 9B, the changed transparency level value may be applied to the lower end layer, according to a ratio of a non-overlapping area as in the case of the first screen 922, the second screen 924, the third screen 926, and the fourth screen 928. Specifically, the first screen 922 is a screen on which a swipe input is not yet made, and a non-overlapping area does not exist. Therefore, a lower end layer may be transparently expressed, and objects of an opaque upper end layer and a background screen may be displayed on a displayed. According to a swipe input, the second screen 924, the third screen 926, and the fourth screen 928 may be sequentially displayed. A non-overlapping area may be more opaquely expressed on the third screen 926 than on the second screen 924, and a non-overlapping area may be more opaquely expressed on the fourth screen 928 than on the third screen 926. For example, when ratios of non-overlapping areas on the second screen 924, the third screen 926, and the fourth screen 928 are 0.2 (20%), 0.4 (40%), and 1 (100%), respectively, a transparency level of the lower end layer may have values of 80%, 60%, and 0% which are gradually changed.

The embodiment, in which transparency level values are subdivided according to non-overlapping areas, has been described with reference to FIG. 9A. In order to provide a fade-in effect according to movement of a layer, the procedure described with reference to FIG. 9A may be repeatedly performed. For example, the electronic device 101 may periodically perform the procedure of FIG. 9A at predetermined time intervals. Specifically, a predetermined time interval may be determined according to frames per second that the display 410 of the electronic device 101 has. Further, when repetition of an operation according to frames per second imposes a burden on calculation by the electronic device, the processor 430 may repeat the above-described procedure at any cycle designated by the user. As another example, the electronic device 101 may perform the procedure of FIG. 9A on the basis of an event. Specifically, the electronic device 101 may perform the procedure of FIG. 9A in response to movement of an upper end layer by a predetermined distance or more. Therefore, a transparency level of a lower end layer may be changed during the movement of the upper end layer, and thus a fade-in/out effect can be provided during switching of a layer according to the user's swipe input.

In the embodiment described with reference to FIG. 9A, the adjustment of a transparency level of a lower end layer has been described, but the scope of the disclosure is not limited thereto. In other words, the processor 430 may further adjust a transparency level of an upper end layer as well as a transparency level of the lower end layer. In this example, the transparency level of the upper end layer may be adjusted according to a tendency opposite to that for adjustment of the transparency level of the lower end layer. That is, the lower end layer becomes more opaque, whereas the processor 430 may adjust a transparency level value of the upper end layer so that the upper end layer becomes more transparent. As an example, the processor 430 may simultaneously change transparency level values of the upper end layer and the lower end layer, and in this example, may configure the sum of the transparency level values of the upper end layer and the lower end layer so as to become any integer value which is always equal in magnitude. For example, referring to FIG. 9B, transparency levels of upper end layers on the first screen 922, the second screen 924, and the third screen 926 may be different from each other. That is, as a layer is switched from an upper end layer to a lower end layer, the lower end layer may be expressed to be gradually opaque, and the upper end layer may be expressed to be gradually transparent. As described above, the electronic device 101 may provide a fade-out effect to the upper end layer, and may provide a fade-in effect to the lower end layer.

In addition, the processor 430 may provide an additional effect in a layer switching process. In some embodiments, the processor 430 may add a shadow effect and a highlight effect in order to clearly distinguish between layers in a layer switching process. In this example, the user of the electronic device can experience a shadow effect and a highlight effect at a boundary part of a lower end layer and an upper end layer, and thus it is possible to more clearly distinguish between layers.

Figure 10A:
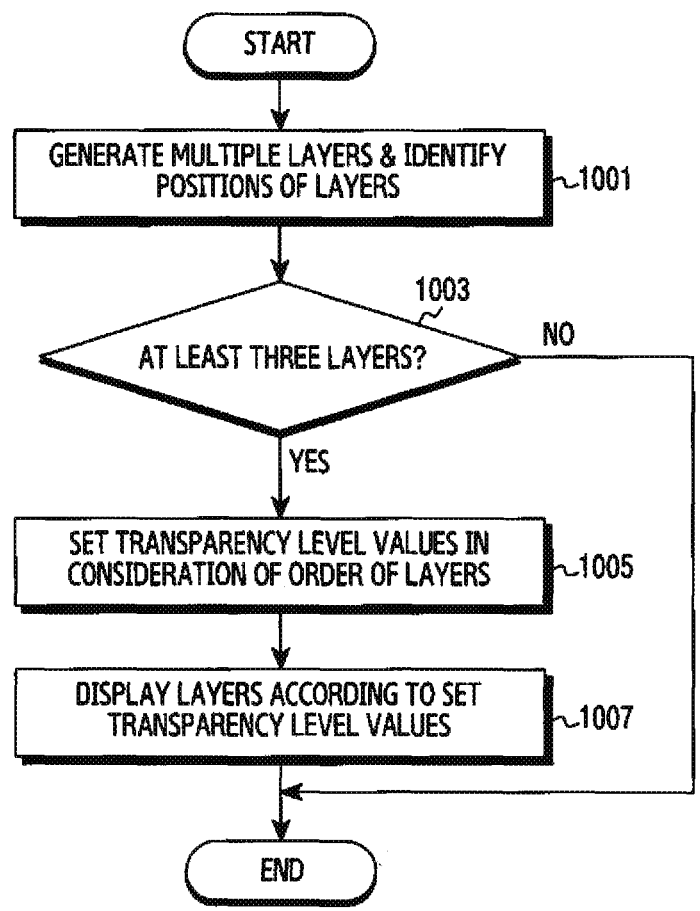
FIG. 10A is a flowchart illustrating adjustment of a layer when at least three layers overlap each other in an electronic device according to various embodiments of the disclosure.

FIG. 10A is a flowchart illustrating adjustment of a layer when at least three layers overlap each other in an electronic device according to various embodiments of the disclosure.

Referring to FIG. 10A, in operation 1001, the electronic device 101 may generate multiple layers, and may identify positions of the layers. In this example, the multiple layers may partially overlap each other.

Figure 10B:
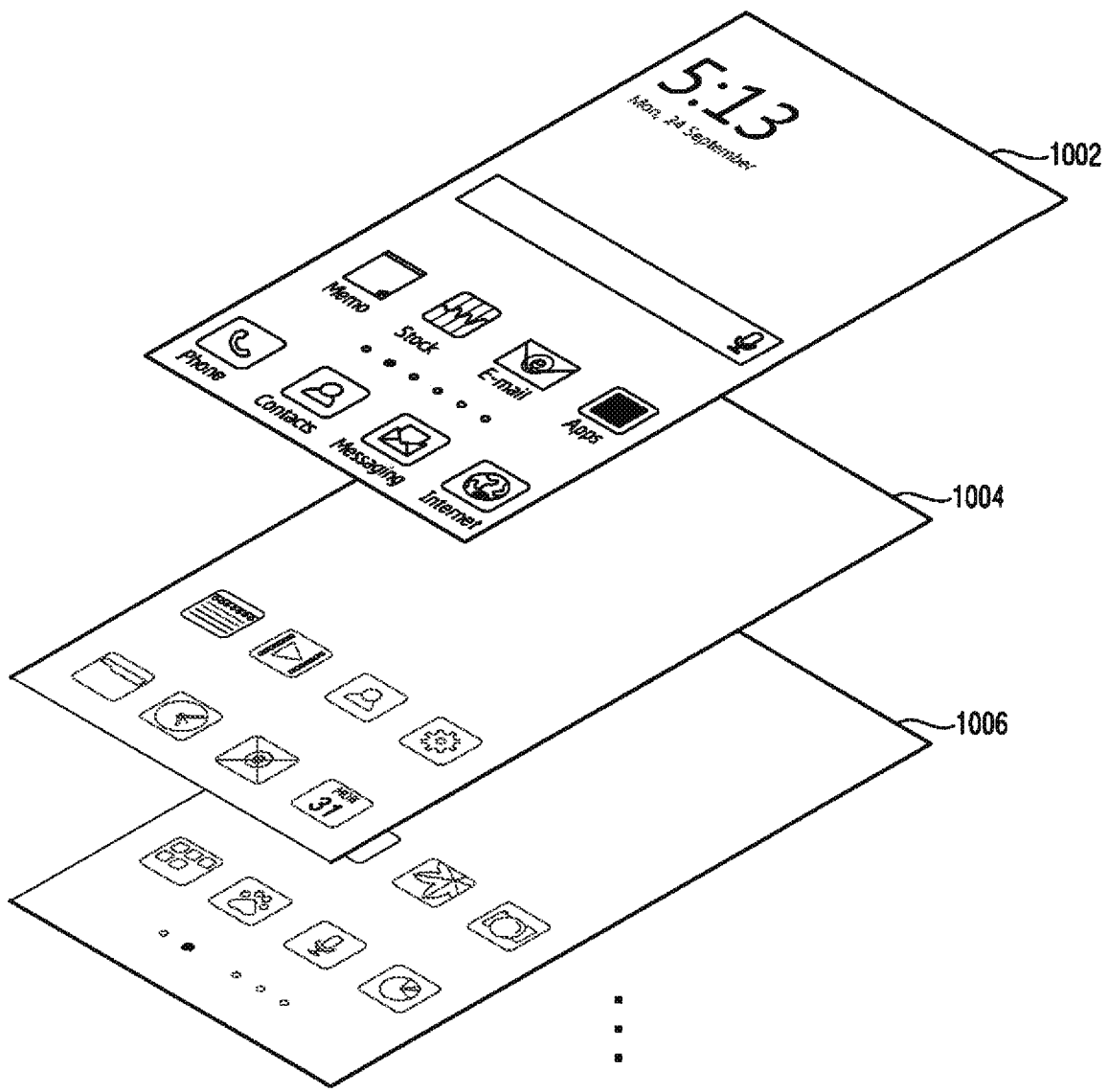
FIG. 10B illustrates an example of controlling lower end layers when at least three layers are displayed in an electronic device according to various embodiments of the disclosure.

In operation 1003, the electronic device 101 may determine whether at least three layers overlap in an overlapping area. In other words, the electronic device 101 may determine whether multiple lower end layers exist. In some embodiments, the processor 430 may determine that an upper end layer overlaps a lower end layer in an overlapping area. In this example, two layers overlap in the overlapping area, and thus the procedure may be terminated. For example, as illustrated in FIG. 10B, when three layers 1002, 1004, and 1006 exist, the procedure proceeds to operation 1005.

In operation 1005, the electronic device 101 may set transparency level values of the layers in consideration of the order of the layers. In an embodiment, transparency level values may be set to be increased as a layer comes closer to the lowest end layer. In this example, as illustrated in FIG. 10B, in the lower end layers 1004 and 1006, transparency level values of parts corresponding to an overlapping area may be set to a fixed value representing transparency, and transparency level values of parts corresponding to a non-overlapping area may be differently set according to the order in the lower end layers 1004 and 1006. For example, as in the lower end layers 1004 and 1006 illustrated in FIG. 10B, transparency level values of the parts corresponding to the non-overlapping area may be increased at equal intervals as a layer comes closer to the lowest end layer. In another example, a transparency level value of a part, which corresponds to the non-overlapping area, of the remaining at least one lower end layer except for the first lower end layer may be set to a value representing transparency.

In operation 1007, the electronic device 101 may display the layers according to the set transparency level values. Since objects included in the layers may depend on a transparency level value of a corresponding layer, the processor 430 may express the objects so that a transparency level becomes higher as the corresponding layer comes closer to the lowest end layer. Therefore, a user of the electronic device 101 can recognize existence of the objects of the lower end layers, and simultaneously, can avoid interruptions in visual recognition of objects of the upper end layer and a background screen.

At least some parts of a device (e.g., modules or functions thereof) or a method (e.g., operations), based on embodiments of the present disclosure, can be implemented with an instruction stored in a non-transitory computer-readable storage medium (e.g., the memory 130) as a program module. When the instruction is executed by a processor (e.g., the processor 120), the processor can perform a function corresponding to the instruction. The non-transitory computer readable recording medium can include, for example, a hard disk, a floppy disc, a magnetic medium (e.g., a magnetic tape), an optical storage medium (e.g., a Compact Disc-ROM (CD-ROM) or a DVD, a magnetic-optic medium (e.g., a floptical disc)), and an internal memory. The instruction can include code created by a compiler or code executable by an interpreter. The module or program module can further include at least one or more components among the aforementioned components, or can omit some of them, or can further include additional other components. Operations performed by a module, program module, or other components of the various embodiments of the present disclosure can be executed in a sequential, parallel, repetitive, or heuristic manner. In addition, some of the operations can be executed in a different order or may be omitted, or other operations may be added.

According to various embodiments of the disclosure, a non-transitory computer-readable recording medium may include multiple instructions. The multiple instructions may be configured to, when executed by a processor, cause the processor to perform: displaying a first layer, at least a part of which is transparent; and displaying a second layer, at least a part of which overlaps the first layer and which is disposed at a lower end of the first layer. In the non-transitory computer-readable recording medium, the at least the part of the second layer may be configured to be transparently displayed.

According to an embodiment of the disclosure, a remaining part except for the at least the part in the second layer may be opaquely displayed. Further, the remaining part except for the at least the part in the second layer may have a transparency level adjusted according to a ratio of the remaining part relative to the second layer. Further, the first layer and the second layer may be generated by a launcher application, and may be displayed in a transparent window.

In the above-described specific embodiments of the disclosure, an element included in an electronic device is expressed in a singular or plural form according to a presented specific embodiment. However, the singular or plural expression is appropriately selected according to the presented situation for convenience of description, and the disclosure is not limited to a single element or multiple elements thereof. An element expressed in the plural form may be configured as a single element, or an element expressed in the singular form may be configured as multiple elements.

While specific embodiments have been described in the detailed description of the disclosure, it goes without saying that various changes can be made within a limit without departing from the scope of the disclosure. Therefore, the scope of the disclosure should not be limited to and defined by the above-described embodiments, and should be defined not only by the appended claims but also by the equivalents to the scope of the claims.

The invention claimed is:

1. An operating method of an electronic device, the operating method comprising:

identifying an event to display a first layer comprising at least one transparent part and at least one opaque part by overlapping on at least a part of a second layer comprising at least one transparent part and at least one opaque part, on a display, while a background layer which is disposed below the second layer is displayed through the at least one transparent part of the second layer;

in response to the identification of the event, identifying an overlapping area of the first layer and a second layer, wherein the second layer is disposed at a position which at least a part of the at least one opaque part of the second layer is displayed through the at least one transparent part of the first layer;

during layer switching in response to a user input, gradually decreasing a transparency value of the second layer as a non-overlapping area increases based on a ratio of the non-overlapping area in the second layer, and displaying the first layer and the second layer based on the performed at least one operation, wherein the at least one opaque part of the first layer comprises at least one area with at least one of an application execution icon or a widget therein, and wherein the at least one transparent part of the first layer is a remaining area other than the at least one opaque part of the first layer.

2. The operating method as claimed in claim 1, wherein at least a part of the second layer overlaps the first layer and is configured to be transparently displayed, and a remaining part except for the at least the part in the second layer is opaquely displayed.

3. The operating method as claimed in claim 2, wherein the remaining part in the second layer has a transparency level adjusted according to a ratio of the remaining part relative to the second layer.

4. The operating method as claimed in claim 2, wherein the first layer has a transparency level adjusted according to a ratio of the remaining part relative to the second layer.

5. The operating method as claimed in claim 1, wherein the first layer and the second layer are generated by a launcher application, and the first layer and the second layer are displayed in a transparent window.

6. An electronic device comprising:
a display; and
a processor,
wherein the processor is configured to:

identify an event to display, on the display, a first layer comprising at least one transparent part and at least one opaque part by overlapping on at least a part of a second layer comprising at least one transparent part and at least one opaque part, and a second layer, while a background layer which is disposed below the second layer is displayed through the at least one transparent part of the second layer, in response to the identification of the event, identify an overlapping area of the first layer and the second layer, wherein the second layer is disposed at a position which at least a part of the at least one opaque part of the second layer is displayed through the at least one transparent part of the first layer;

during layer switching in response to a user input, gradually decreasing a transparency value of the second layer as a non-overlapping area increases based on a ratio of the non-overlapping area in the second layer, and display the first layer and the second layer based on the performed at least one operation, wherein the at least one opaque part of the first layer comprises at least one area with at least one of an application execution icon or a widget comprised therein, and wherein the at least one transparent part of the first layer is a remaining area other than the at least one opaque part of the first layer.

7. The electronic device as claimed in claim 6, wherein at least a part of the second layer overlaps the first layer and is configured to be transparently displayed, and a remaining part except for the at least the part in the second layer is opaquely displayed.

8. The electronic device as claimed in claim 7, wherein the remaining part in the second layer has a transparency level adjusted according to a ratio of the remaining part relative to the second layer.

9. The electronic device as claimed in claim 6, wherein the first layer and the second layer are generated by a launcher application, and the first layer and the second layer are displayed in a transparent window.

10. The electronic device as claimed in claim 7, wherein the first layer has a transparency level adjusted according to a ratio of the remaining part relative to the second layer.

11. A non-transitory computer-readable recording medium including multiple instructions, the multiple instructions being configured to, when executed by a processor, cause the processor to perform:

identifying an event to display a first layer comprising at least one transparent part and at least one opaque part by overlapping on at least a part of a second layer comprising at least one transparent part and at least one opaque part, on a display, while a background layer which is disposed below the second layer is displayed through the at least one transparent part of the second layer;

in response to the identification of the event, identifying an overlapping area of the first layer and a second layer, wherein the second layer is disposed at a position which at least a part of the at least one opaque part of the second layer is displayed through the at least one transparent part of the first layer;

during layer switching in response to a user input, gradually decreasing a transparency value of the second layer as a non-overlapping area increases based on a ratio of the non-overlapping area in the second layer, and displaying the first layer and the second layer based on the performed at least one operation, wherein the at least one opaque part of the first layer comprises at least one area with at least one of an application execution icon or a widget therein, and wherein the at least one transparent part of the first layer is a remaining area other than the at least one opaque part of the first layer.

12. The recording medium as claimed in claim 11, wherein at least a part of the second layer overlaps the first layer and is configured to be transparently displayed, and a remaining part except for the at least the part in the second layer is opaquely displayed.

13. The recording medium as claimed in claim 12, wherein the remaining part in the second layer has a transparency level adjusted according to a ratio of the remaining part relative to the second layer.

14. The recording medium as claimed in claim 11, wherein the first layer and the second layer are generated by a launcher application, and the first layer and the second layer are displayed in a transparent window.

\* \* \* \* \*